United States Patent [19]
Addeo et al.

[11] Patent Number: 5,609,803
[45] Date of Patent: Mar. 11, 1997

[54] PROCESS FOR MANUFACTURING BODIES OF POLYMERIC MATERIAL, HAVING A CORE OF FOAMED MATERIAL ENCLOSED IN AN OUTER SHELL

[75] Inventors: Antonio Addeo, Novara; Francesco Mascia, Guanzate; Annibale Vezzoli, Carugo; Aurelio Biscotti, Milan, all of Italy

[73] Assignee: Centro Sviluppo Settori Impiego S.r.l., Milan, Italy

[21] Appl. No.: 345,619

[22] Filed: Nov. 28, 1994

Related U.S. Application Data

[62] Division of Ser. No. 208,093, Mar. 8, 1994, Pat. No. 5,368,458, which is a continuation of Ser. No. 974,941, Nov. 12, 1992, abandoned.

[30] Foreign Application Priority Data

Nov. 13, 1991 [IT] Italy .................. MI91A3014

[51] Int. Cl.$^6$ .................................................. B29C 44/06
[52] U.S. Cl. ............................................... 264/46.6; 264/53
[58] Field of Search .................. 264/53, 46.6, 45.9, 264/514, 46.9, 515, 516, 510

[56] References Cited

U.S. PATENT DOCUMENTS

| | | | |
|---|---|---|---|
| 3,088,166 | 5/1963 | Colombo | 264/514 |
| 3,378,612 | 4/1968 | Dietz et al. | |
| 3,389,197 | 6/1968 | Flynn et al. | |
| 3,736,201 | 5/1973 | Teraoka | 264/46.6 |
| 3,792,140 | 2/1974 | Schiemann | 264/514 |
| 3,875,275 | 4/1975 | Lemelson | 264/46.6 |
| 3,901,958 | 8/1975 | Doll | 264/45.5 |
| 4,092,385 | 5/1978 | Balevski et al. | |
| 4,149,839 | 4/1979 | Iwawaki et al. | |
| 4,668,567 | 5/1987 | Williams | 264/46.6 |
| 4,874,649 | 10/1989 | Daubenbuchel et al. | 264/46.4 |
| 5,093,054 | 3/1992 | Hirota | |
| 5,152,856 | 10/1992 | Thein et al. | 264/46.6 |
| 5,328,651 | 7/1994 | Gallagher et al. | 264/46.5 |
| 5,366,674 | 11/1994 | Hattori et al. | 264/45.4 |
| 5,368,458 | 11/1994 | Addeo et al. | 425/817 R |

FOREIGN PATENT DOCUMENTS

| | | | |
|---|---|---|---|
| 1492471 | 7/1967 | France | |
| 1564114 | 3/1969 | France | |
| 2316835 | 4/1974 | Germany | |
| 2304543 | 8/1974 | Germany | 264/515 |
| 59-20635 | 2/1984 | Japan | 264/46.6 |
| 2175225 | 7/1990 | Japan | 264/514 |
| 3293113 | 12/1991 | Japan | |

*Primary Examiner*—Allan R. Kuhns
*Attorney, Agent, or Firm*—Bryan Cave L.L.P.

[57] ABSTRACT

A process for producing bodies of polymeric material having an outer shell and a core of foamed material is disclosed. The process includes the steps of: providing a mold having a pair of separable half-molds arranged facing each other; extruding a tubular thermoplastic parison between the half-molds; closing the half-molds around the parison, thereby defining a hollow space between the parison and walls of the mold; injecting into the inside of the parison a thermoplastic polymeric material admixed with a physical blowing agent, the parison expanding into contact with the walls of the mold, and conforming to the shape of the mold; and removing the article form the mold.

1 Claim, 2 Drawing Sheets

PROCESS FOR MANUFACTURING BODIES OF POLYMERIC MATERIAL, HAVING A CORE OF FOAMED MATERIAL ENCLOSED IN AN OUTER SHELL

This is a divisional of U.S. application Ser. No. 08/208,093, filed Mar. 8, 1994, now U.S. Pat. No. 5,368,458 which is a continuation of U.S. application Ser. No. 07/974,941, filed Nov. 12, 1992, now abandoned.

BACKGROUND OF THE INVENTION

The present invention relates to a process for manufacturing bodies of polymeric material by means of the blow-molding technique, in particular to provide bodies comprising a core of foamed material enclosed by an external shell.

Such bodies normally display a rigid structure and good properties of heat insulation, so to make the use thereof for such household electrical appliances, as refrigerators, and the like, particularly advantageous. At present, the technique of blow-molding is used in order to manufacture a hollow shell of thermoplastic material, inside which a thermosetting foam is subsequently injected, for example a polyurethane foam obtained by means of the well-known RIM technology. Such an operating way shows problems both in terms of possibility of finished article recycling, and in terms of environmental pollution by the foaming agent.

In fact, the chemical nature of the foamed polyurethanic core makes it impossible for the manufactured article to be recycled, and the chloro-fluoro-alkane foaming agent normally used in RIM technology causes problems of interaction with ozone in the stratosphere. Furthermore, the execution of the process according to the two-step technology known from the prior art (blow-molding and subsequent foam injection) causes the production cycle to be rather slow and expensive.

The purpose of the present invention is of supplying a process of the type as specified in the introduction to the specification, which does not display these drawbacks and which is simple and inexpensive to carry out.

According to the invention, such a purpose is achieved because the blowing is performed by introducing into the interior of a hollow thermoplastic body a foamable thermoplastic polymeric material suitable for bringing the walls of the hollow body into contact with the walls of a mold.

By "foamable thermoplastic polymeric material" any thermoplastic material mixed with a foaming agent, e.g., $CO_2$, $N_2$, hydrocarbons, are meant. It is evident that, as in the traditional blow-molding technology, the hollow extruded body (parison) is at a temperature close to the polymer softening temperature, and anyway such as to secure the "blowing" of the hollow body. This feature is particularly advantageous in the case of the present invention, because the foamed thermoplastic material (which also is at a temperature which is close to the polymer softening temperature) can be thermowelded to the walls of the hollow body, thus making it possible to obtain a structurally resistant manufactured article. A further advantage of the present invention relates to the possibility of using the same polymeric material, or materials belonging to the same polymeric family, for both the foamed core and the external shell, making it possible for the manufactured article to be recycled at the end of its useful life time. The process according to the present invention also makes it possible for the production cycle to be speeded up, as compared to the traditional technology of blow-molding and subsequent foaming of the cooled hollow shell.

A further purpose of the present invention is providing a device for carrying out the above said process.

Such a device, of the type which comprises an extruder with an accumulation chamber suitable for cyclically extruding a tubular parison between two mobile half-molds, is characterized in that said device also comprises a second extruder for a polymeric material admixed with a foaming agent, and an auxiliary accumulation chamber in communication with said second extruder, and equipped with an injection nozzle centrally installed relative to a ring-shaped nozzle for the tubular parison extrusion.

Further advantages and characteristics of the process and device according to the invention will be clear from the following disclosure in detail, supplied for merely exemplifying, non-limitative, purposes, by referring to the accompanying drawings, in which:

DESCRIPTION OF THE PREFERRED EMBODIMENT

Figure 1:
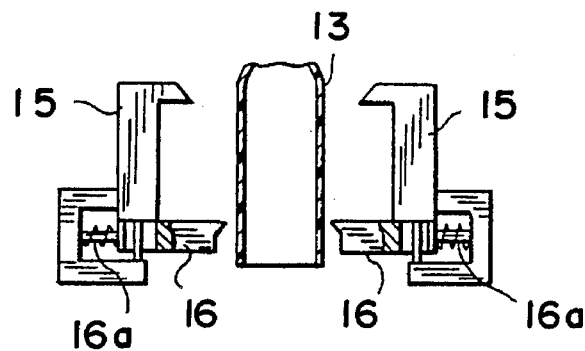
FIGS. 1, 2, 3, 4 display four sequential steps of a process according to the present invention.

Referring to the drawings, with the reference numeral 1 the end portion of an extruder for a compact polymeric material, such as, e.g., polypropylene, is indicated. The extruder 1 is fastened onto a main body 3, to which the end of a second extruder 2 for a foamable polymeric material, such as, e.g., polypropylene admixed with $CO_2$, $N_2$, hydrocarbons, is also fastened. The first extruder 1 is in communication with an annular accumulation chamber 4, inside which the compact material accumulates; said chamber 4 is coaxial with a central cylindrical accumulation chamber 10 for the foamable material. The annular accumulation chamber 4, the volume of which is adjustable, is equipped with an annular ram 5 actuated, by means of stems 5a, by a hydraulic jack 18a, to feed a determined amount of molten polymer to a ring-like extrusion die 6. The jack 18a is interposed between a mobile plate 17 fastened onto the end of the stems, and a fixed plate 12 integral with body 3.

In an analogous way, the central accumulation chamber 10, connected with the second extruder by means of a channel 8, is equipped with a self-cleaning ram 9 actuated by a jack 18b through a central stem 9a. The ram 9 delivers under pressure, through a valve 11, a determined amount of foamable polymeric material, in the plastic state, centrally to the ring-like die 6. The free opening of the latter is furthermore adjustable by means of a jack 18c which, by means of stems 7a, changes the position of an end plate 7 relatively to the central portion, i.e., the core portion, of the ring-like die 6.

Under the latter, a mold is installed, which comprises two self-shearing half-molds 15 opposite to each other, and suitable for being frontally locked to each other, so as to define a hollow. Each half-mold 15 is furthermore provided, at its bottom end, with a mobile insert 16 suitable for translating, relatively to the same half-mold, in a direction which is the same direction of closure of the half-molds 15, in the way which is better explained in the following.

Figure 2:
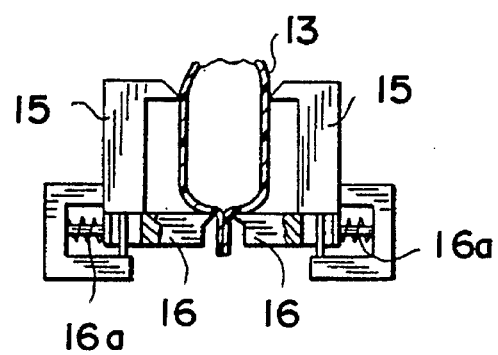
Figure 3:
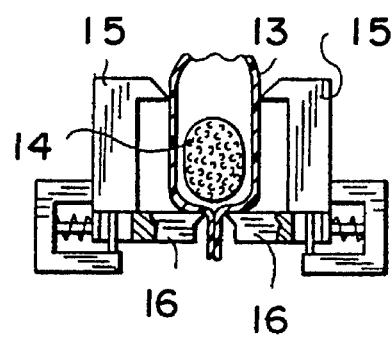

Referring to FIG. 1, a tubular parison 13 of thermoplastic material is extruded through the die 6, under desired conditions of temperature and pressure, into the room comprised between both half-molds 15. At the end of the step of extrusion of the tubular parison 13, the latter is closed in its bottom portion, by means of the two inserts 16 which, during said step of the process, translate integrally with the half-molds 15 according to a transversal direction to parison 13 extrusion direction (FIG. 2). Then, into the interior of the tubular parison 13, closed at its bottom, the foamable polymeric material 14 present inside the central accumulation chamber 10, is injected (FIG. 3). The injection of the foamable material into the interior of the tubular parison is performed according to a sequential, extremely quick, operation of opening of valve 11, actuation of ram 9 and closure of valve 11.

Figure 4:
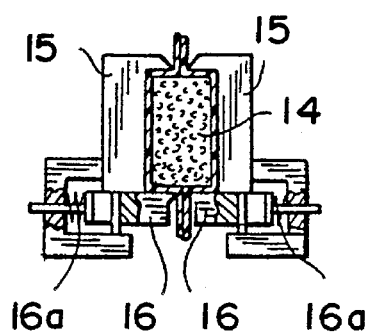
Figure 5:
FIG. 5 shows a longitudinal sectional view of a manufactured article produced by means of the process according to the invention.

The foamable material, owing to the low pressure existing inside the interior of the parison, can freely foam urging the walls of the parison 13 against the walls of half-molds 15—which in the meanwhile can be locked to each other— and to conform to said walls (FIG. 4). During the foaming step, the foam acts as the tubular parison shaping means. During such a step, the closure of the two half-molds 15, and the shearing action performed by the mobile inserts 16 (urged by springs 16a interposed between the insert and the relevant half-mold) causes the piece indicated in FIG. 5 with the reference character P to be peripherically sheared; said piece P, after suitable cooling, can be de-molded.

In order to improve the forming step, the annular hollow room comprised between the parison and the mold walls can be advantageously depressurized.

EXAMPLE 1

Figure 6:
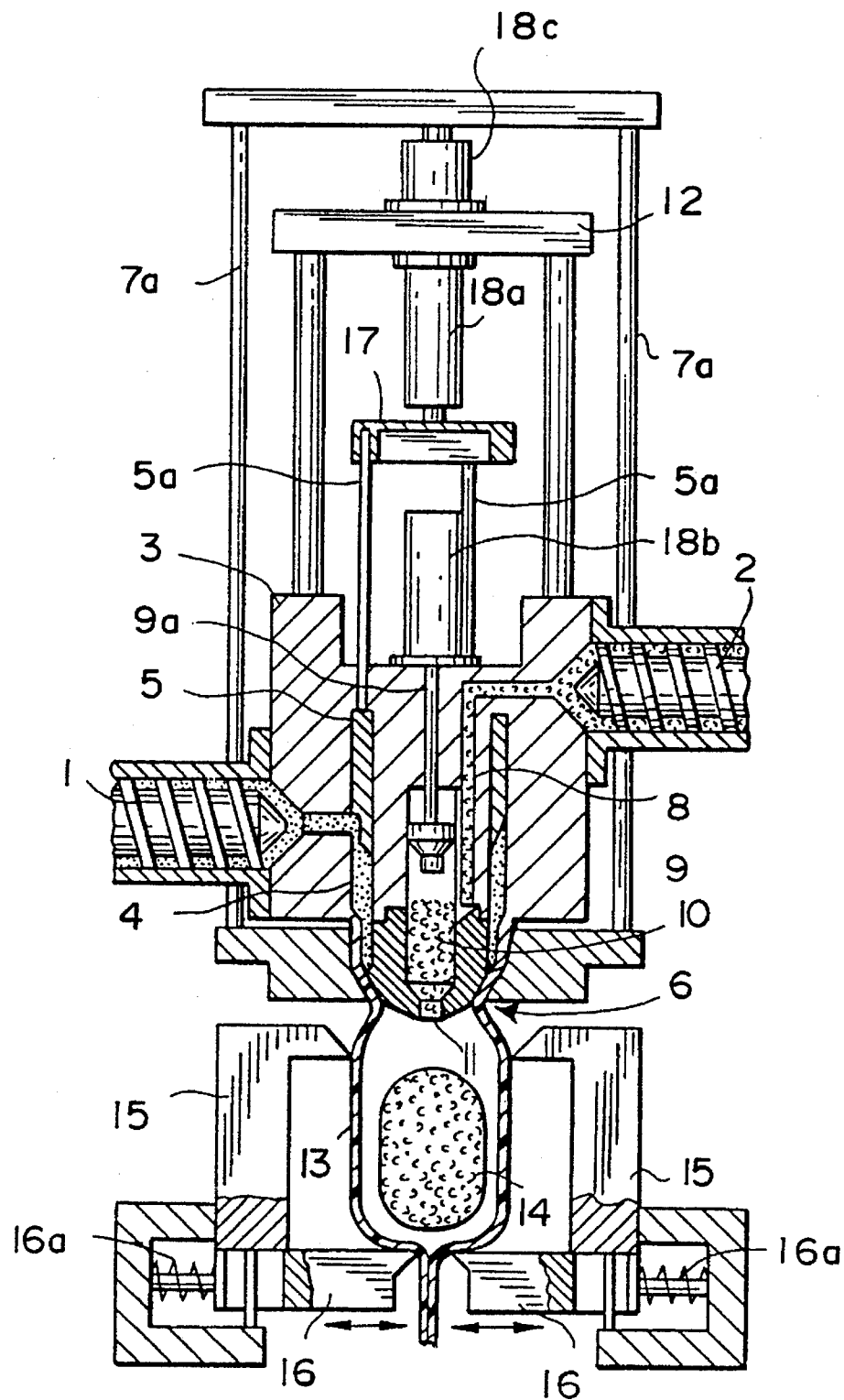
FIG. 6 shows a longitudinal sectional view of a device according to the present invention.

This test was carried out by using the equipment displayed in FIG. 6.

A polypropylene marketed by Company Himont under the trade name Moplen SP 98/E, having a melt index of 0.7 g/10 minutes, was fed to the extruder (1) having a diameter of 120 mm, and a screw length:diameter ratio=30.

Polypropylene was extruded at a flowrate of 150/h, with a corresponding screw revolution speed of 30 rpm.

At the extruder screw end (1) values of pressure of 140 bars (2000 lb/p$^2$), and a temperature of molten polymeric mass of 210° C. were measured.

Through a heated fitting, the molten polymer enters then the accumulation chamber (4), which has a maximal volume of 9 liters.

To the extruder (2) a compound was fed which consisted of 100 parts of a polypropylene marketed by Company Himont under the trade name Profax HMS PF 814, having a melt index of 2.5 g/10 minutes, 1.0 parts of "Hydrocerol Compound" ex Boehringer, and 0.5 parts of zinc stearate.

The extruder (2) is of double screw type with corevolving screws, having a diameter of 90 mm and a length:diameter ratio=16.6.

Into the extruder, a mixture of isobutane and butane in the ratio of 30:70 was directly injected into the molten polymeric mass, at a distance from the feed point of approximately ⅓ of the total extruder length.

The hydrocarbon mixture was injected with a flowrate equivalent to 7 percent by weight, based on the weight of polypropylene resin.

The molten mass constituted by the polymer, the additives and the gas, intimately mixed with one another, passes from an homogenization temperature of approximately 215° C. to an extruder leaving temperature of 160° C.

From the extruder, the polymer/foaming agent mixture runs through a heated feed channel, going to fill the accumulation chamber (10), having a maximal inner volume of 4 liters.

The pressure value as measured at the extruder screw end was of 100 bars.

When the filling of both accumulation chambers was completed, the process was continued according to the operating steps as illustrated in FIGS. from 1 to 5.

From the accumulation chamber (4) a tubular parison is extruded, which has a diameter of 500 mm and an average thickness of 4 mm.

The length of tubular parison was fixed as 1.3 meters.

The conditions of molten polymer flowrate adopted in parison extrusion were of 1.2 kg/second, equivalent to a falling axial speed of 13 m/min.

After causing both mobile inserts (16) installed in the bottom portion of both half-molds to come into contact with each other in order to "weld" in that area the tubular parison of material, still in the molten state, into the parison the polymer/foaming agent mixture contained inside the accumulation chamber (10) was injected.

Said foamable mixture leaves from the closure valve (11), having a circular cross-section of 12 mm of diameter, at a flowrate of 2 160 kg/hour.

The injection time was of 2 seconds, to which an amount of injected foamable mixture of 1.2 kg corresponds.

Simultaneously to the injection of the foamable mixture, both half-molds (15) close, to form a hollow having a parrelelepipedal shape of dimensions of 600×1100×50 mm.

The resulting end product is a structural body which reproduces the dimensions of the hollow, characterized by an outer layer of compact polypropylene, coming from extruder (1), having an average thickness of 3.5 mm, and an inner core of foamed polypropylene having a density of 35 kg/m$^3$.

EXAMPLE 2

The instant test was carried out by using the same equipment as illustrated in FIG. 6, and operating according to the procedure as disclosed in Example 1.

To extruder (1), a polystyrene was fed, which is marketed by Company Enichem Polimeri under the trade mark Edistir SRL 800, having a melt index of 3.5 g/10 minutes, at a flowrate of 180 kg/hour, for a corresponding screw revolution speed of 25 rpm.

To extruder (2), a compound was fed, which consisted of 100 parts of a polystyrene marketed by Company Enichem Polimeri under the trade name Edistir N 1380, having a melt index of 3.0 g/10 minutes, 0.5 parts of "Hydrocerol Compound" ex Boehringer, and 0.2 parts of zinc stearate.

The foaming agent used was the same mixture of butane:isobutane 70:30 of Example 1 with a flowrate equivalent to 6 percent by weight, based on the weight of polystyrene resin.

The pressure value measured at the end of extruder screw was of 160 bars, with a temperature of the molten mass of 145° C.

The conditions adopted in extrusion of parison were the same as of Example 1, with the diameter of the opening of the closure valve (11) being increased from 12 to 20 mm, in order to keep the injection flowrate of foamable mixture unchanged (2 160 kg/hour, to which, during a time of 2 seconds, an injected amount of 1.2 kg corresponds).

The end product obtained is an integrally polystyrene structural body with an outer compact layer of 3.5 mm of thickness, and an inner foamed core having a density of 35 kg/m$^3$.

We claim:

1. A process for manufacturing an article of polymeric material having a core of foamed material enclosed by an outer shell, the method comprising the steps of:

(a) providing a mold comprising a pair of separable half-molds arranged facing each other;

(b) extruding a substantially tubular thermoplastic parison having interior walls and exterior walls between the half-molds;

(c) closing the half-molds around the parison, the mold and the parison having dimensions whereby a hollow space is formed between the parison and the exterior walls of the mold;

(d) simultaneously with the closing of the two half-molds from step (c), injecting into the inside of the parison a foamable thermoplastic polymeric material admixed with a physical blowing agent, the injection being carried out in a time equal to 2 seconds or less;

(e) the foamable thermoplastic polymeric material admixed with the physical blowing agent expanding within the parison, causing the parison to expand into contact with the walls of the mold so as to conform to the shape of the mold, and thermowelding the foamable thermoplastic material to the interior walls of the parison; and (f) removing the article from the mold.

* * * * *